United States Patent Office 3,480,632
Patented Nov. 25, 1969

3,480,632
PROCESS FOR CYCLODIMERIZING 1,2-OXIRANES, 1,2 THIIRANES AND 1,2-AZIRIDINES
John A. Scheben, Erlanger, Ky., and Irving L. Mador, Cincinnati, Ohio, assignors to National Distillers and Chemical Corporation, New York, N.Y., a corporation of Virginia
No Drawing. Filed Dec. 28, 1965, Ser. No. 517,113
Int. Cl. C07d 51/72
U.S. Cl. 260—268                     10 Claims

ABSTRACT OF THE DISCLOSURE

A process is provided for cyclodimerizing 1,2-oxiranes to 1,4-dioxanes, 1,2-thiiranes to 1,4-dithianes, and 1,2-aziridines to piperazines, in the presence of a platinum or palladium triad catalyst. New perhydrodibenzo-1,4-dioxanes also are provided.

---

This invention relates to a process for cyclodimerizing 1,2-oxiranes to 1,4-dioxanes, 1,2-thiiranes to 1,4-dithianes, and 1,2-aziridines to piperazines, respectively, in the presence of a platinum or palladium triad catalyst.

It is well known that compounds containing an epoxy or oxirane linkage can be cyclodimerized. Ethylene oxide, for example, can be dimerized to form 1,4-dioxane in the presence of acidic catalysts. The reaction proceeds with difficulty, however, when the epoxides have substituents on the oxirane ring, and in such instances the oxiranes frequently dimerize to produce dioxolanes rather than 1,4-dioxanes. Thus, for example, propylene oxide, unlike ethylene oxide, dimerizes to form 2-ethyl-4-methyl-1,3-dioxolane in the presence of a sodium bisulfate catalyst, and styrene oxide yields principally 2-benzyl-4-phenyl-1,3-dioxolane in the presence of stannous chloride.

U.S. Patent No. 3,140,296 to McClure, issued July 7, 1964, describes a process which seeks to avoid the formation of dioxolanes in such cyclodimerizations by using the epoxyhaloalkanes and a metal carbonyl catalyst, such as cobalt carbonyl, containing at least one tertiary phosphine molecule, dicobalt octacarbonyl, and similar compounds. The resulting product is a mixture of the cis- and trans-2,5-bis(haloalkyl) 1,4-dioxanes, which mixture is in general employed without separation of the isomers. This process requires a halogen atom on the epoxyalkane, however, and is not useful with epoxyalkanes free from such substitution.

In accordance with the instant invention, a process is provided for the cyclodimerization of epoxides to 1,4-dioxanes, which cyclization is apparently unaffected by substituent groups on the oxirane ring. Thus, in accordance with the invention, ethylene oxide produces 1,4-dioxane; styrene oxide, 2,5-diphenyl-1,4-dioxane; and propylene oxide, 2,5-dimethyl-1,4-dioxane, in a relatively straight forward cyclodimerization. The process of the invention accordingly has made possible the production of dioaxnes of hitherto unknown structure, such as perhydrodibenzo-1,4-dioxane, a new compound. The reaction takes place at moderate temperatures in the presence of a platinum or palladium triad catalyst, and good yields of the expected cyclodimer are obtained.

Furthermore, the reaction is effective not only with oxiranes but also with thiiranes and with aziridines or 1,2-cyclicimines to form 1,4-dithianes and piperazines, respectively.

The reaction in accordance with the invention can be represented by the following scheme:

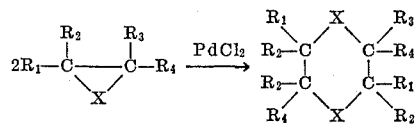

In the above equation, $R_1$, $R_2$, $R_3$, and $R_4$ are each selected from the group consisting of hydrogen and organic radicals having from one to about thirty carbon atoms, for example, alkyl, alkenyl, aryl, aralkyl, alkaryl, and cycloalkyl groups. X represents oxygen, sulfur, or imino. The $R_1$ and $R_4$ pairs and/or the $R_2$ and $R_3$ pairs can be taken together to form a cyclic ring, which can be cycloaliphatic or heterocyclic, and which can have from four to seven ring atoms selected from the group consisting of carbon, oxygen, sulfur, and nitrogen atoms. In heterocyclic rings there will usually not be more than one or two hetero atoms, the remainder of the ring atoms being carbon.

When the $R_1$ and $R_4$ pairs or the $R_2$ and $R_3$ pairs are taken together to form a cycloaliphatic ring, a new group of compounds is formed, of the structure:

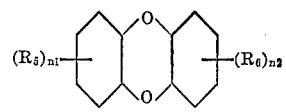

wherein $R_5$ and $R_6$ are alkyl groups having from one to about thirty carbon atoms and $n_1$ and $n_2$ are integers representing the number of such groups on each ring and range from zero to four.

The epoxide that is cyclodimerized in accordance with the invention can have one, two, or more epoxy groups. When two or more epoxy groups are present, polymeric products are formed with recurring dioxane groups in the chain.

Typical $R_1$, $R_2$, $R_3$, $R_4$, $R_5$ and $R_6$ alkyl substituents include methyl, ethyl, propyl, isopropyl, butyl, isobutyl, tertiary butyl, isoamyl, tertiary amyl, hexyl, 2-ethylhexyl, isooctyl, isononyl, decyl, dodecyl, and octadecyl; typical $R_1$, $R_2$, $R_3$ and $R_4$ alkenyl, aryl, alkaryl, aralkyl and cycloalkyl substituents include benzyl, phenyl, xylyl, tolyl, naphthyl, ethylbenzyl, dodecylphenyl, mesityl, tetrahydrofurfuryl, cyclohexyl, cyclopentyl, and cycloheptyl.

The $R_1$, $R_2$, $R_3$, and $R_4$ groups can include inert substituents which are unaffected by the cyclodimerization, such as halogen, for example, chlorine, bromine, and fluorine; nitrile; nitro; ether; ester; carbonyl; and like groups.

Exemplary compounds which can be cyclodimerized in accordance with the invention include ethylene oxide, propylene oxide, 1,2-butylene oxide, 2,3-butylene oxide, styrene oxide, 1,2-decylene oxide, cyclohexene oxide, p-nitrostyrene oxide, 4-methoxybutene-1,2-epoxide, 4-cyanocyclohexene-1,2-epoxide, and methyl-9, 10-epoxy-stearate, butadiene monoepoxide, 4-vinylcyclohexene-1,2-epoxide, tetramethylethyleneoxide, hexadecene-1,2-epoxide, and diisobtuylene epoxide, ethylene, sulfide, propylene sulfide, cyclohexene sulfide, styrene sulfide, 1,2-butylene sulfide, 2,3-butylene sulfide, ethylene imine, propylene imine, 1,2-butylene imine, cyclohexene imine, styrene imine, 2,3-butylene imine, N-ethyl ethylene imine, N-phenyl ethylene imine, and 4-methoxybutene-1,2-episulfide.

The reaction proceeds in the presence of any platinum or palladium triad catalyst, generically referred to in the claims as a "platinum-palladium triad catalyst," including, for example, platinum, palladium, iridium, rhodium, ruthenium, and osmium. These metals can be employed in the form of the metal or in the form of a metal compound, such as, for example, the metal salts, for instance the chloride, nitrate, sulfate, bromide, acetate; the oxides of the metal; and complexes of the metal such as the benzonitrile, bis-π-allyl, or acetylacetonate complexes. The metal or metal compound can be supported on an inert carrier, such as carbon, alumina, or silica. The palladium halides are particularly preferred because they are readily available and quite effective. Exemplary are palladous chloride and palladous bromide.

The reaction proceeds in the presence of very small amounts of the catalyst. From 0.001 to 20 molar percent based on the amount of epoxide employed is effective. Best results are obtained when amounts within the range from about 0.1 to 2 molar percent are employed, and, accordingly, such amounts are preferred. Two or more metal catalysts can be employed in combination for advantageous effects.

Exemplary catalysts are palladium on carbon, palladous oxide, palladous benzoate, bis(benzonitrile) palladous chloride, and the chloride of rhodium, ruthenium, platinum, iridium, and osmium; platinous acetate; rhodium oxide; palladous cyanide; rubidium carbonate; iridium chloride; potassium chloropalladite; and palladous acetylacetonate.

Compounds known to complex with the platinum-palladium triad groups can also be added as co-catalysts. Examples of such ligands include triphenylphosphine, carbon monoxide, pyridine, benzonitrile, and pentane-1,3-dione. Small amounts of such co-catalysts suffice to give an improved effect. Amounts within the range from about 10 to about 500 mole percent based on the catalyst are usually adequate.

Among the complexing materials, carbon monoxide is especially preferred. This does not take part in the reaction and does not become a part of the final product, but enhances the reactivity and improves the yield. When carbon monoxide is used, the reaction is best performed in a closed vessel, and preferably under pressure within the range from about 1 atmosphere to about 300 atmospheres.

The reaction is preferably carried out in the liquid phase. If the epoxide is a liquid, it can serve as the reaction medium per se. If the epoxide is a solid or gas, the reaction is best carried out in the presence of an inert solvent. The reaction mixture is preferably anhydrous, and thus anhydrous solvents should be used.

Any inert organic solvent which takes no part in the cyclodimerization reaction and is not reactive with the catalyst can be employed, including, for example, aliphatic and aromatic hydrocarbons, such as isooctane, mineral spirits, heptane, dodecane, octane, toluene, xylene, benzene, mesitylene, petroleum ether, and other inert organic liquids such as the various ethers, for example, diethyl ether, and methylethyl ether, benzonitrile, dimethylformamide, tetrahydrofuran, dimethoxyethane, tributyl phosphine, and butyl chloride.

The reaction can also be conducted in the vapor phase, over a supported platinum-palladium triad catalyst. Suitable supporting materials are silica, alumina, carbon, pumice, firebrick, and others. The reactant epoxide, thiirane or aziridine and diluent vapor or gas, if any, are passed over the catalyst at a temperature so that the reactant and product are in vapor form. Exemplary diluents are carbon monoxide, nitrogen, argon and helium. The reaction may advantageously be conducted at superatmospheric pressures up to 300 atmospheres. The reaction product can be separated and unreacted materials recycled as in the case of the liquid phase process.

The reaction proceeds at room temperature, but an increase in reaction rate can be obtained at elevated temperatures. The upper limit of temperature is not critical and is determined by the decomposition temperatures of the reactants and of the reaction products. In general, a satisfactory reaction is obtained at temperatures within the range from about 20° to about 250° C. At temperatures below 20° C. the reaction may be too slow for most purposes, but such temperatures can, of course, be employed if slowness is not a factor. In general, satisfactory reaction rates at optimum yields are obtained at temperatures within the range from about 40° to about 120° C., and such temperatures are accordingly preferred.

If the reactants or solvent are volatile at the reaction temperature, it is of course, necessary to carry out the reaction in a closed or pressure vessel. The catalyst may be insoluble in the reaction mixture and in the reaction product, and in such instances is recovered at the conclusion of the reaction by filtration or centrifuging. Since the catalyst takes no part in the reaction, it is recovered substantially unchanged and can be reused. The filtrate is fractionally distilled to remove unreacted materials, such as unreacted epoxide, and inert solvents, if any. The reaction product is generally higher boiling than these materials and remains as the residue. If it is very high boiling, it can be distilled at reduced pressure.

The process of the invention is particularly adapted for a continuous operation. In this case the reactants, the epoxide, thiirane, or aziridine catalyst and solvent, if any, are combined continuously and conducted to the reactor in which they are held at the reaction temperature for the required reaction time. If desired, the reactor can be in the form of an elongated tube, the traverse time of which is equal to the reaction time.

In the case of a liquid phase operation, the catalyst is then separated from the reaction mixture by filtration or centrifuging, and the filtrate separated by fractional distillation to recover the final product as the residue. Unreacted materials including catalyst can be recycled to the start of the reactor system.

In the case of vapor phase operation the catalyst bed is maintained in the reactor and no catalyst separation is required.

The following examples, in the opinion of the inventors, represent the best embodiments of their invention.

Example 1

Palladous chloride (9 millimoles) and ethylene oxide (0.84 mole) were placed in a pressure reactor. Carbon monoxide was then added to an initial pressure of 60.5 atmospheres. The reactor contents were stirred and heated at 50° C. for 17.5 hours. At the completion of this time, the reactor contents were cooled, the excess pressure vented, and the contents filtered. The filtrate was distilled at atmospheric pressure, and the fraction boiling at 98° to 105° C. collected. By infrared analysis and gas chromatography this fraction was identified as 1,4-dioxane. The conversion amounted to 44% and the yield 73.5%.

Example 2

A 200 ml. pressure bottle was charged with 4.5 millimoles of palladous chloride and 0.5 mole of ethylene oxide and heated at 50° C. for 17.5 hours. The reactor contents were then cooled and analyzed. They were found to contain 1,4-dioxane in a conversion of 44%.

Example 3

A series of micro pressure reactors were each charged with 0.11 mole of ethylene oxide and then individually with one of the following catalysts (the amounts of catalysts given are in millimoles):

| | |
|---|---|
| Iridium chloride | 1.88 |
| Platinous chloride | 1.98 |
| Ruthenium chloride | 2.48 |
| Rhodium chloride | 2.07 |
| Palladous chloride | 2.11 |

Each of the reactors was heated and tumbled in an oil bath maintained at 48° C. for 17.5 hours. After cooling, the reactors were opened, and the contents analyzed by gas chromatography. The reaction product in each case was 1,4-dioxane. It was thus evident that each of these was effective in the process of the invention.

Example 4

To a small pressure bottle was added 2.2 grams of a mixture of 10% palladium on carbon (1.8 millimoles of palladium) and 1.29 moles of ethylene oxide. The reaction mixture was stirred and heated at 45° C. for seventeen hours. The reactor contents were then cooled and analysed by vapor phase chromatography. The reaction product was identified as 1,4-dioxane.

Example 5

In a glass liner of a rocking autoclave were placed 8.8 millimoles of palladous chloride and 0.51 mole of styrene oxide. The reactor was closed and pressured to 74.5 atmospheres with carbon monoxide. Then the reactor contents were heated at 90° C. for eight hours. At the conclusion of this reaction time, the reactor was cooled and vented, and the contents were then filtered. The filtrate was distilled under reduced pressure, and the fraction boiling at 160°–180° C./1 mm. was collected. A sample of this material was recrystallized from acetone, melting point 177°–178° C. (uncorrected). Infrared analysis of the product was consistent with the structure expected for 2,5-diphenyl-1,4-dioxane. The reported melting point for 2,5-diphenyl-1,4-dioxane is 175° C., J. Am. Chem. Soc. 77, 5095 (1955). A 35% yield of product was obtained.

Example 6

The following materials were added to the glass liner of a pressure reactor: 0.25 millimole of bis(benzonitrile) palladous chloride complex and 0.13 mole of cyclohexene oxide. The reactor was closed and saturated with carbon monoxide at 85 atmospheres. The reactor was then heated at 85° C. for 19.5 hours with stirring. Then the reactor was cooled, and the excess pressure vented. The solid reaction product was taken up in low boiling petroleum ether and recrystallized several times. The product had a melting range of 94° to 112° C. Infrared analysis indicated a cyclic ether. Carbon-hydrogen analysis was consistent with the structure of perhydrodibenzo-1,4-dioxane:

Found: Carbon, 74.48%; Hydrogen, 10.32%. Theory $C_{12}H_{20}O_2$: Carbon, 73.43%; Hydrogen, 10.26%.

Assigned structure based on infrared and carbon-hydrogen analysis:

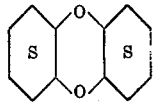

By the same procedure, alkyl-substituted cyclohexene oxides such as methyl cyclohexene oxide and ethyl cyclohexene oxide give alkyl-substituted perhydrodibenzo-1,4-dioxanes, i.e., perhydro-di(methylbenzo)-1,4-dioxane and perhydro-di(ethylbenzo)-1,4-dioxane.

Example 7

Propylene oxide (0.85 mole) and palladous chloride (8.9 millimoles) were heated together at 60° C. for twenty-three hours under 61 atmospheres of carbon monoxide pressure. The reaction product was analyzed by vapor phase chromatography and mass spectrometry. A liquid product having a mass of 116 was recovered. The molecular weight corresponded to that of 2,5-dimethyl-1,4-dioxane.

Example 8

In a glass liner of a rocking autoclave were placed 8.8 millimoles of palladous chloride and 0.51 mole of ethylene sulfide. The reactor was closed and pressured to 74.5 atmospheres with carbon monoxide. Then the reactor contents were heated at 90° C. for eight hours. After cooling and venting, the bomb contents were filtered, then distilled. By infrared analysis and gas chromatography 1,4-dithiane was identified as a product.

Example 9

Palladium acetylacetonate (9 millimoles) and ethylene imine (0.84 mole) were placed in a pressure reactor. Carbon monoxide was then added to an initial pressure of 60.5 atmospheres. The reactor contents were stirred and heated at 50° C. for 17.5 hours. At the completion of this time, the reactor contents were cooled, the excess pressure vented, and the contents filtered. The filtrate was distilled at atmospheric pressure, and the fraction boiling at 145° C. was collected. By infrared analysis and gas chromatography, this fraction was identified as piperazine.

Example 10

Ethylene oxide vapors were passed at a rate of 0.12 l./min. through a vertically mounted reactor containing 14.0 g. of a 5% palladium chloride catalyst deposited on activated carbon having a 12 x 40 mesh size. The reaction temperature was maintained at 80° C. The effluent was collected over a two-hour period and distilled at ambient temperature. Gas chromatographic analysis of the distillation residue identified 1,4-dioxane as the reaction product.

Example 11

Nitrogen, 0.04 l./min. and ethylene oxide, 0.12 l./min. were metered through calibrated flowmeters into a gas mixer and then in a reaction tube which contained a catalyst comprising 5% palladium chloride deposited on charcoal. After two hours at 95° C., 28 g. of reaction product were recovered. 1,4-dioxane was identified in this reaction product by vapor phase chromatographic analysis.

Example 12

Carbon monoxide, 0.04 l./min. and ethylene oxide 0.04 l./min. were fed simultaneously over a palladium catalyst such as described in Example 10. The reaction temperature was maintained at 72° C. Analysis of the reaction product found 1,4-dioxane.

It is apparent that in accordance with the process of the invention it is possible to prepare 1,4-dioxanes of a variety of types having substituent groups on the epi carbon atoms thereof which heretofore were quite difficult, if not impossible, to obtain. In the case of simple epoxides, such as ethylene oxide, ethylene sulfide, and ehtylene imine, known products are obtained. In the case of the more complex epoxides, such as cyclohexene oxide, the products obtained are new compounds.

The product obtained from cyclohexene oxide, perhydrodibenzo-1,4-dioxane, can be converted to dibenzo-1,4-dioxane (or diphenylene oxide) by dehydrogenation. Either the cycloalkyl or aromatic compounds can be ring-substituted by appropriate means. These classes of materials are useful as pharmaceuticals and pesticides; specifically as antihistamines and nematocides.

The products of the invention, being 1,4-dioxanes, 1,4-dithianes and piperazines, undergo the conventional reactions for such materials. They are useful as plasticizers for various polymeric materials. The lower molecular weight liquid materials are useful as solvents; the thiane derivatives are useful curing agents in the production of epoxy resins.

Having regard to the foregoing disclosure, the following is claimed as the inventive and patentable embodiments thereof:

1. A process for the cyclodimerization of compounds having the formula:

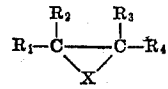

to form compounds having the formula

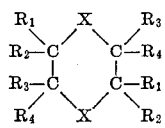

in which $R_1$, $R_2$, $R_3$ and $R_4$ are each selected from the group consisting of hydrogen, alkyl having from one to about eighteen carbon atoms, benzyl, phenyl, xylyl, tolyl, naphthyl, ethylbenzyl, dodecylphenyl, mesityl, tetrahydrofurfuryl, cyclohexyl, cyclopentyl, and cycloheptyl and in which the $R_1$ and $R_4$ pairs and/or the $R_2$ and $R_3$ pairs can be taken together to form a saturated cyclic ring having from four to seven ring carbon atoms and X is selected from the group consisting of oxygen, sulfur and imino; which comprises reacting the said 1,2-oxirane, 1,2-thiirane or 1,2-aziridine in the presence of a platinum, palladium, ruthenium, rhodium, osmium or iridium catalyst at a temperature within the range from about 20 to about 250° C. but below the decomposition temperature of the reactants and the reaction products, to form the corresponding cyclodimer.

2. A process in accordance with claim 1 in which the amount of catalyst is within the range from about 0.001 to about 20 molar percent based on the amount of the 1,2-oxirane, 1,2-thiirane or 1,2-aziridine.

3. A process in accordance with claim 1 in which the reactant is a 1,2-oxirane.

4. A process in accordance with claim 1 in which the reactant is a 1,2-thiirane.

5. A process in accordance with claim 1 in which the reactant is a 1,2-aziridine.

6. A process in accordance with claim 1 in which the catalyst is supported on an inert carrier.

7. A process in accordance with claim 1 in which the catalyst is selected from the group consisting of palladium metal and palladium compounds.

8. A process in accordance with claim 1 in which the catalyst is in the form of a cocatalyst complex with a compound complexing with the catalyst metal.

9. A process in accordance with claim 1 in which the reaction is conducted in the presence of carbon monoxide under a pressure within the range from about 1 to about 300 atmospheres.

10. A process in accordance with claim 1 in which the reaction is conducted in the presence of an inert organic solvent.

References Cited

UNITED STATES PATENTS

| | | | |
|---|---|---|---|
| 2,035,386 | 3/1936 | Salzberg | 260—340.6 |
| 2,142,033 | 12/1938 | McNamee | 260—340.6 X |
| 2,267,686 | 12/1941 | Kyrdes | 260—268 |
| 2,474,782 | 6/1949 | Dixon | 260—268 X |
| 3,070,605 | 12/1962 | Warner | 260—327 |
| 3,140,296 | 7/1964 | McClure | 260—340.6 |
| 3,149,130 | 9/1964 | Guest | 260—340.6 |
| 3,226,400 | 12/1965 | Kaupp | 260—340.3 |
| 3,324,130 | 6/1967 | Ham | 260—268 |

DONALD G. DAUS, Primary Examiner

U.S. Cl. X.R.

252—431, 447, 460, 472; 260—327, 340.3, 340.6, 239, 88.3, 348, 429, 270, 2